United States Patent
Jarlstedt

(10) Patent No.: US 7,092,388 B2
(45) Date of Patent: Aug. 15, 2006

(54) INTERCONNECTION OF SIGNALLING NODES

(75) Inventor: Mats Jarlstedt, Karlstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1035 days.

(21) Appl. No.: 10/101,601

(22) Filed: Mar. 21, 2002

(65) Prior Publication Data
US 2002/0136235 A1 Sep. 26, 2002

(30) Foreign Application Priority Data
Mar. 21, 2001 (SE) .................................... 0101015

(51) Int. Cl.
*H04L 12/50* (2006.01)

(52) U.S. Cl. .................... 370/384; 370/466; 379/221.1

(58) Field of Classification Search ................ 370/351, 370/352, 353, 354, 356, 359, 373, 377, 384, 370/385, 392, 419, 420, 465, 466, 467, 496; 379/221.09, 221.1, 221.12, 229, 350, 351, 379/353
See application file for complete search history.

(56) References Cited

U.S. PATENT DOCUMENTS

| | | | |
|---|---|---|---|
| 5,852,660 A | 12/1998 | Lindquist et al. | |
| 6,011,780 A | 1/2000 | Vaman et al. | |
| 6,301,245 B1* | 10/2001 | Luzeski et al. | 370/352 |
| 6,731,741 B1* | 5/2004 | Fourcand et al. | 379/221.08 |
| 6,778,491 B1* | 8/2004 | Fourcand et al. | 370/217 |
| 6,839,340 B1* | 1/2005 | Voit et al. | 370/352 |
| 2001/0049730 A1* | 12/2001 | Brendes et al. | 709/223 |

* cited by examiner

*Primary Examiner*—Phirin Sam
(74) *Attorney, Agent, or Firm*—Nixon & Vanderhye, P.C.

(57) ABSTRACT

A method and an apparatus of adding an application in a signal messaging network without adding a node in the network. An application platform is connected between two nodes by means of a first link and a second link. The application platform only comprises OSI stacks to layer 2 after which a link management and any possible application takes over. The link management will mirror the status of the two links to thereby keep the application platform unobtrusive, i.e. giving appearance of it not being connected between the two nodes.

32 Claims, 7 Drawing Sheets

INTERCONNECTION OF SIGNALLING NODES

TECHNICAL FIELD

The present invention pertains to signalling systems for telecommunications, and particularly to an addition of an application in signalling systems for telecommunications.

BACKGROUND

Telecommunications system typically employ some sort of signalling system for setting up and clearing connections (e.g. calls) handled by the telecommunications system. The signalling system in a signalling plane which is distinct from a user plane in which user data (e.g. user traffic) is transported through the telecommunications system. The International Telecommunications Union Telecommunications (ITU-T) developed an internationally standardized general purpose common channel signalling system called Signalling System exchange information. The signalling is done over a digital signalling network to execute functions such as call setup, routing, and control of wired and wireless calls. The Signalling System No. 7 (SS7), like other protocols, is susceptible to conceptualization on the layers of the OSI Reference Model developed by the International Standard Organization.

Typically certain transfer points must be utilized or interposed in the signalling network in order to transport signalling messages over great distance from an originating node to a destination node. In fact, several transfer points (e.g. signal transfer points [STPs]) may be used to route signalling message from the originating node to the destination node. The transfer points often take the form of switches that must be configured to accommodate the routing of signalling messages between the originating node and the destination node. Thus, the originating node must configure those transfer points (e.g. set up the switches of the transfer points), and each transfer point must route the signalling message to the next node (e.g. another transfer point), and so on until the destination node is reached.

When an application, such as a protocol converter, is to be added to a signalling network, then a node with the application has to be added to the signalling network. This will result in at least parts of the network, and most probably large parts of the network, have to be updated with new routing information, such that information will properly reach the new node, and information that has to be routed via the new node is properly routed. It is thus undesirable to change the network, it is also undesirable to add new nodes, as the number of nodes in a network is limited.

U.S. Pat. No. 5,867,788 and U.S. Pat. No. 5,852,660 both describe conventional methods of adding a protocol converter by means of adding a node in a signalling network. There thus seems to be a room for improvement in the techniques adding an application in a signalling system network.

SUMMARY

What is needed, therefore, and an object of the present invention, is a technique for adding an application in a signalling system.

Said object is achieved by a method and an apparatus of adding an application in a signal messaging network without adding a node in the network. An application platform is connected between two nodes by means of a first link and a second link. The application platform only comprises OSI stacks to layer 2 after which a link management and any possible application takes over. The link management will mirror the status of the two links to thereby keep the application platform unobtrusive, i.e. giving appearance of it not being connected between the two nodes. In a preferred but not exclusive mode of the invention, the signalling protocol is Signalling System No. 7 (SS7) and the platform only comprises MTP-L1 and MTP-L2.

Said object is further achieved by an application platform for the addition of an application between a first node and a second node of a telecommunications signalling system which utilize a signalling protocol, by means of connection of the application platform between the first node and the second node. According to the invention the application platform comprises a first interface stack coupled to the first node by means of a first link, a second interface stack coupled to the second node by means of a second link, and a link management unit coupled to the first interface stack and to the second interface stack. The link management unit mirrors a status of one link onto the other link by forcing it to assume the same kind of status. With mirroring there are no status messages as such sent on the other link, mirroring of a status is putting the other link into a same state artificially. The first interface stack and the second interface stack are incomplete stacks in relation to the OSI standard routing functions, i.e the stacks do not comprise means for routing functions, these functions normally reside in layer three. This enables a connection of the application platform between the first node and the second node with still the first node considering itself connected directly to the second node by means of the first link without any intervening node or nodes and with still the second node considering itself connected directly to the first node by means of the second link without any intervening node or nodes.

Suitably the link management unit mirrors a status of one link onto the other link by being arranged to receive first reports of a status of the first link from the first interface stack, to receive second reports of a status of the second link from the second interface stack, to direct to the second interface stack to control the second link in accordance with any received first report, and to direct to the first interface stack to control the first link in accordance with any received second report, thereby forcing the other link to assume the same kind of status. A first report is to be understood as a report coming from the first interface stack and a second report is to be understood as a report coming from the second stack. The link management unit is further suitably arranged to direct to the first interface stack to raise the status of the first link, i.e. restore the first link, after a received first report of a lowered status of the first link, i.e. a link failure of the first link, and to direct to the second interface stack to raise the status of the second link, i.e. restore the second link, after a received second report of a lowered status of the second link, i.e. a link failure of the second link. In some applications the link management unit is further arranged to direct to the first interface stack to raise the status of the first link, i.e. restore the first link, after a received second report of a raised status of the second link, i.e. a link restored status of the second link, to direct to the first interface stack to lower the status of the first link, i.e. to stop the first link, after a received second report of a lowered status of the second link, i.e. a link failure status of the second link, to direct to the second interface stack to raise the status of the second link, i.e to restore the second link, after a received first report of a raised status of the first link, i.e. a link restored status of the first link, and to direct to the second interface stack to lower the status of the second link, i.e. to stop the second link, after a received first report of a lowered status of the first link, i.e. a link failure status of the first link. Suitably the first interface stack and the second interface stack are incomplete stacks in relation to OSI standard routing functions, i.e. the stacks do not comprise any standard routing functions which in most cases will means that each one of the stacks only consists of OSI layer one and OSI layer two. Preferably the link management unit changes a signalling message, which is received from one interface stack, from a first type of signalling message to a second type of signalling message of the same signalling protocol before the received signalling message is transferred to the other interface stack. Then suitably the first type of signalling message is a signalling message from an OSI layer two and that the second type of signalling message is a signalling message to an OSI layer two. In some embodiments the signalling protocol of at least the first node is Signalling System No. 7 (SS7), and where the first link is a first SS7 signalling link. Then suitably the first interface stack is a first stack of MTP-L1 layer and MTP-L2 layer. In some other embodiments the signalling protocol is Signalling System No. 7 (SS7), where the first link is a first SS7 signalling link, and where the second link is a second SS7 signalling link. Then suitably the first interface stack is a first stack of MTP-L1 layer and MTP-L2 layer, and the second interface stack is a second stack of MTP-L1 layer and MTP-L2 layer. The application platform can further comprise an application process which work on the interface stacks. The application process can be a protocol converter, converting a received signalling message to another dialect of the protocol of the received signalling message or to another protocol than the protocol of the received signalling message. The application process can be a node preprocessor, preprocessing signalling messages destined for the node in question. Preferably the link management unit mirroring does not start until after an alignment of the first link and the second link has been performed. In most embodiments it is preferable that the only OSI layer one and OSI layer two acknowledgements coming from the application platform are those acknowledgements which the application platform receives on the first link and forwards to the second link, and those acknowledgments the application platform receives on the second link and forwards to the first link.

Said object is also achieved by a method for adding an application between a first node and a second node of a telecommunications signalling system which signalling system utilizes a signalling protocol. According to the invention the method comprises a plurality of steps. In a first step coupling a first interface stack to the first node by means of a first link, the first interface stack being an incomplete stack in relation to OSI standard routing functions. In a second step coupling a second interface stack to the second node by means of a second link, the second interface stack being an incomplete stack in relation to OSI standard routing functions. In a third step coupling a link management unit to the first interface stack and to the second interface stack. In a fourth step the link management unit mirroring a status of one link onto the other link by forcing it to assume the same kind of status. This enables a connection of the application platform between the first node and the second node with still the first node considering itself connected directly to the second node by means of the first link without any intervening node or nodes and with still the second node considering itself connected directly to the first node by means of the second link without any intervening node or nodes.

Suitably the step of the link management unit mirroring a status of one link onto the other link comprises several additional steps. In a first additional step receiving first reports of a status of the first link from the first interface stack. In a second additional step receiving second reports of a status of the second link from the second interface stack. In a third additional step directing the second interface stack to control the second link in accordance with any received first report. In a fourth additonal step directing to the first interface stack to control the first link in accordance with any received second report. This will force the other link to assume the same kind of status. Then suitably the link management unit further comprises the steps of directing the first interface stack to restore, i.e. bring up, the first link after a received first report of a link failure status of the first link, and directing the second interface stack to restore the second link after a received second report of a link failure status of the second link. Then suitably the link management unit further comprises a plurality of further steps. In a first further step directing the first interface stack to restore the first link after a received second report of a link restored status of the second link. In a second further step directing the first interface stack to stop the first link after a received second report of a link failure status of the second link. In a third further step directing the second interface stack to restore the second link after a received first report of a link restored status of the first link. And in a fourth further step directing the second interface stack to stop the second link after a received first report of a link failure status of the first link. Preferably the first interface stack and the second interface stack being incomplete stacks in relation to OSI standard routing functions, which in most cases will mean that each of the stacks only consists of OSI layer one and OSI layer two. In some versions the link management unit further comprises the step of changing a signalling message, which is received from one interface stack, from a first type of signalling message to a second type of signalling message of the same signalling protocol before the received signalling message is transferred to the other interface stack. Then suitably the first type of signalling message is a signalling message from an OSI layer two and the second type of signalling message is a signalling message to an OSI layer two. Preferably the signalling protocol of at least the first node is Signalling System No. 7 (SS7), and where the first link is a first SS7 signalling link. Then suitably the first interface stack is a first stack of MTP-L1 layer and MTP-L2 layer. Suitably the signalling protocol is Signalling System No. 7 (SS7), where the first link is a first SS7 signalling link, and where the second link is a second SS7 signalling link. Then preferably the first interface stack is a first stack of MTP-L1 layer and MTP-L2 layer, and where the second interface stack is a second stack of MTP-L1 layer and MTP-L2 layer. In most versions the application platform further comprises an application process which work on the interface stacks. The application process can comprise the step of converting a received signalling message to another dialect of the protocol of the received signalling message or to another protocol than the protocol of the received signalling message. The application process can comprise the step of preprocessing signalling messages destined for a node in question. Suitably the link management unit step of mirroring does not start until after an alignment of the first link and the second link has been performed. Preferably the only acknowledgements coming from the application platform are those acknowledgements which the application platform receives on the first link and forwards to the second link, and those acknowledgments the application platform receives on the second link and forwards to the first link.

BRIEF DESCRIPTION OF THE DRAWINGS

The foregoing and other objects, features, and advantages of the invention will be apparent from the following more particular description of the preferred embodiments as illustrated in the accompanying drawings in which the same reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail. In order to clarify the method and system according to the invention, some examples of its use will now be described in connection with FIGS. 1 to 9.

Figure 1:
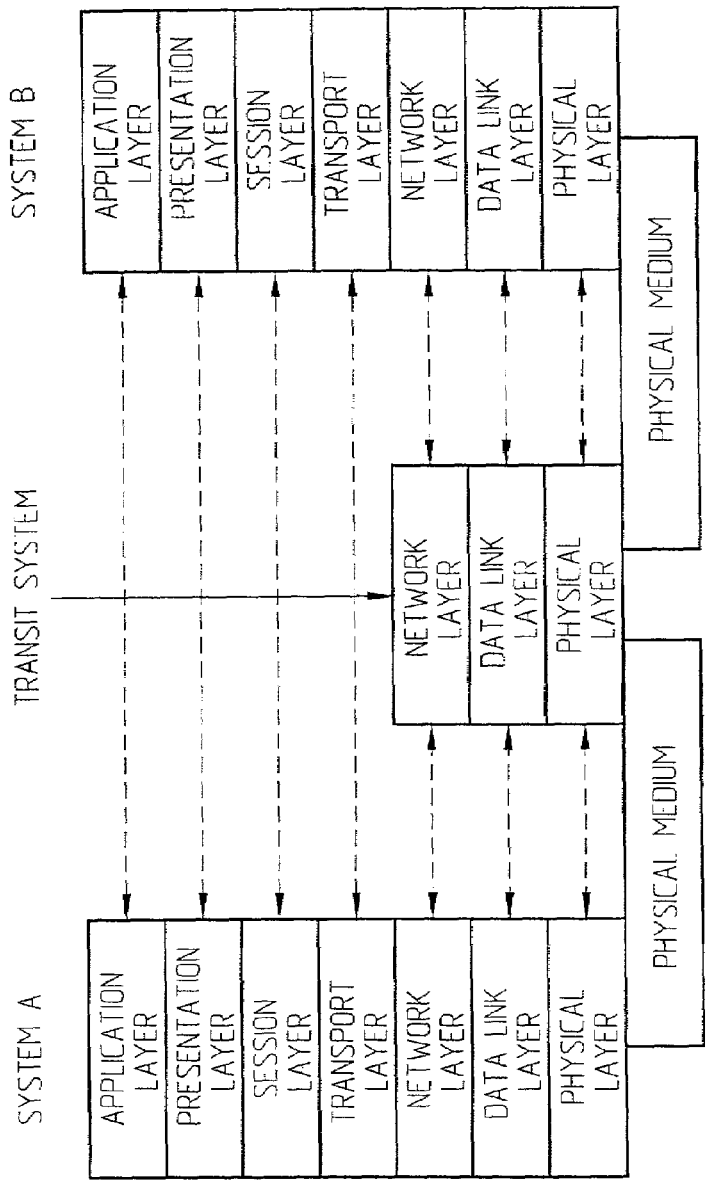
FIG. 1 is a diagrammatic view of the OSI Reference Model.

As shown in FIG. 1, the layers of the OSI Reference Model include (in ascending order) a physical layer, a data link layer, a network layer, a transport layer, a session layer, a presentation layer, and an application layer. A brief non-comprehensive comment follows for each layer of the OSI Reference Model. The lowest layer, the physical layer, provides the physical connectivity between two data terminals. The data link layer provides services for reliable interchange of data across a data link established by the physical layer. The network layer routes data through the network. The transport layer provides a reliable end to end delivery service for higher-layer users. The session layer provides means for cooperating presentation entities to organize and synchronize their dialogue and to manage their data exchange. The presentation layer has services that are primarily concerned with data transformation, data formatting, and data syntax. The application layer, the highest layer, serves as a window through which applications gain access to the communication services provided by the model.

Figure 2:
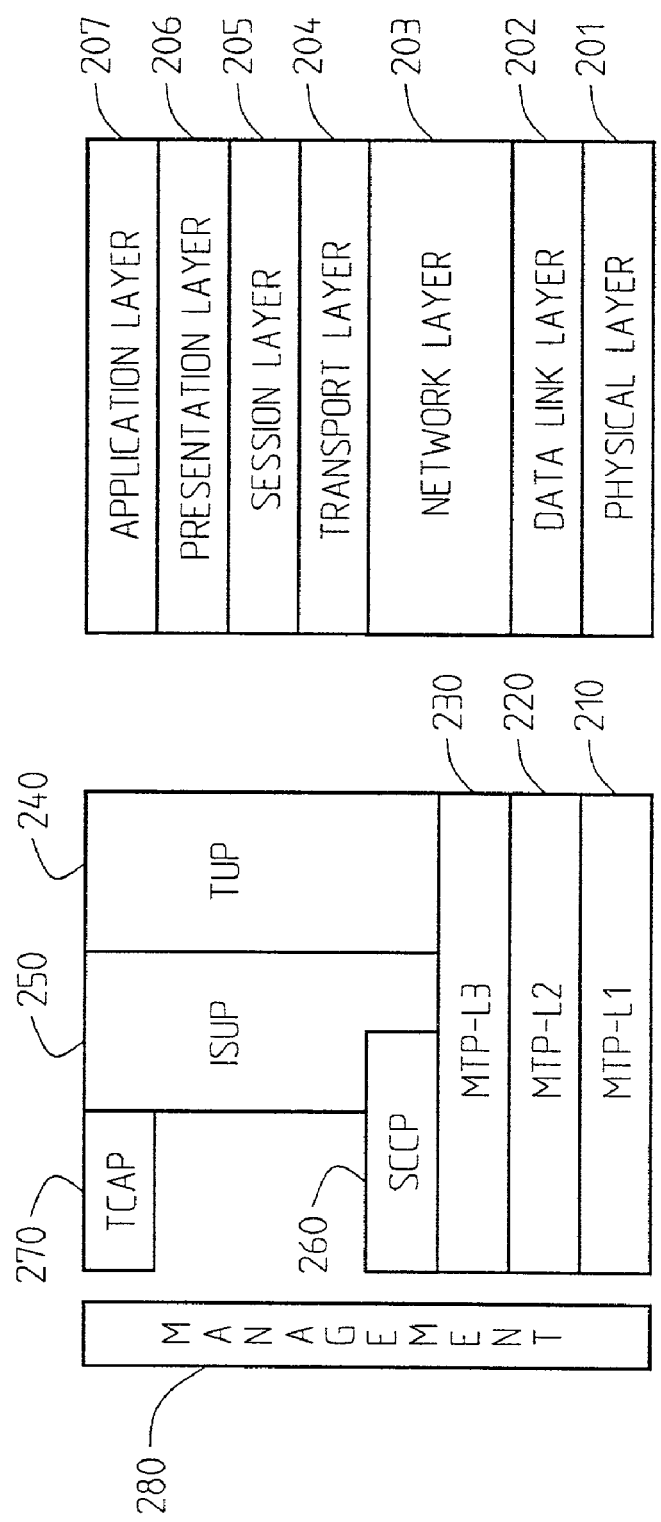
FIG. 2 is a diagrammatic view of protocol components of the Signalling System No. 7 (SS7) referenced to the OSI Reference Model.

FIG. 2 shows how protocol components of the Signalling Systems No. 7 (SS7) are expressed in the OSI Reference Model. One protocol component of SS7 important to the present invention is the Message Transfer Part (MTP) which, as shown in FIG. 2, is divided into three of the OSI layers 201, 202, 203. Briefly, MTP Level 1 (MTP-L1) 210 defines the physical, electrical and functional characteristics of the digital signalling link and corresponds to OSI layer 1 210. MTP Level 2 (MTP-L2) implements flow control, error checking, and sequence validation and corresponds to OSI layer 2 202. MTP Level 3 (MTP-L3) 230 provides message routing between signalling points in the SS7 network and almost corresponds to OSI layer 3 203. SS7 also comprises Signalling Connection Control Part (SCCP) 260 in the OSI layer 3 203. The SCCP offers enhancements to MTP-L3 to provide connectionless and connection oriented network services, as well as to address translation capabilities. Telephone User Part (TUP) 240 corresponds to part of OSI layer 3 to OSI layer 7. TUP is used for basic call setup. In more complex networks ISDN User Part (ISUP) 250 is used instead of TUP. ISUP thus also corresponds to part of OSI layer 3 to OSI layer 7. Signalling Connection Control Part (SCCP) 260 corresponds to part of OSI layer 3 and Transaction Capabilities Application Part (TCAP) 270 corresponds to OSI layer 7. SS7 also has a Management part 280 that mainly deals with error management of all levels/layers.

Figure 3:
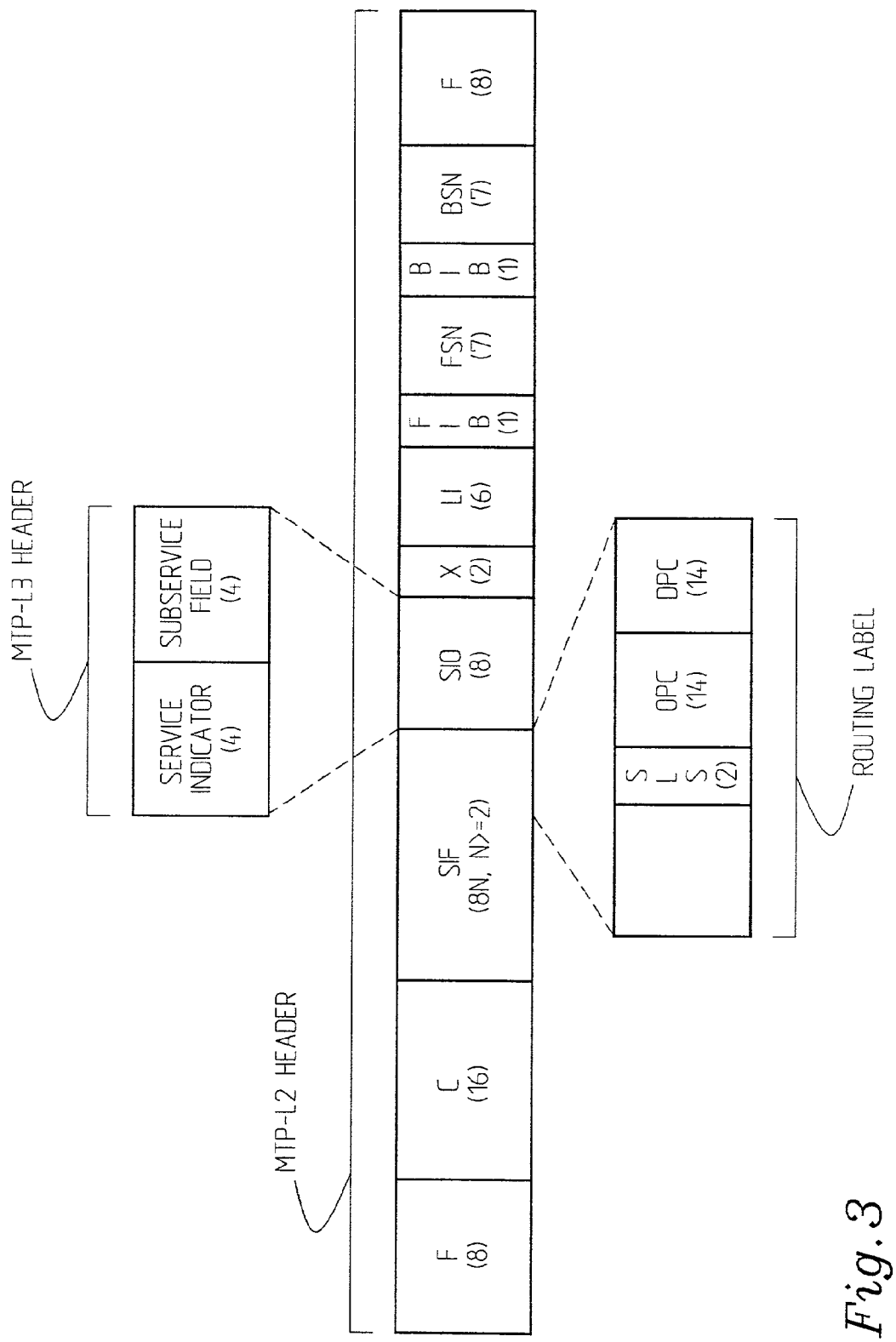
FIG. 3 is a diagrammatic view showing the format of an MTP-L2 header as including an MTP-L3 header and a routing label.

The format of an MTP-L2 header is illustrated in FIG. 3. In the FIG. 3 depiction of the MTP-L2 header, the two fields denoted with an "F" are flag fields (each 8 bits, as indicated by the parenthetical numbers), the BSN field (7 bits) is a backward sequence number; the BIB field (one bit) is a backward indicator bit; the FSN field (7 bits) is a forward sequence number; the FIB field (1 bit) is a forward indicator bit; the LI field (6+2 bits) is a length indicator (indicating the number of octets following the LI field); the SIO field (8 bits) is a service information octet; the SIF field (variable in length) is a signalling information field; and the C field (16 bits) is a checksum utilized for error detection.

FIG. 3 also shows an MTP-L3 header that is subsumed in the MTP-L2 header, and how a routing label is included in the MTP-L2 header. The MTP-L3 header comprises a service indicator (4 bits) and a subservice field (4 bits). The header is included in the service information octet (SIO field).

The routing label is contained in each signalling message and is used by the relevant User Part to identify the purpose of the message and is used by MTP-L3 to process and route the message. The standard routing label, illustrated in FIG. 3, is 32 bits long and is typically placed at the beginning of the signalling information field (SIO). The routing label includes a destination point code (DPC) which indicates the destination of the message and an originating point code (OPC) which indicates the originating point of the message. The coding of these codes is purely binary. Within each field, the least significant bit occupies the first position and is transmitted first. The signalling link selection (SLS) field is used, where appropriate, in performing load sharing. Standard international signalling has a 14 bit DPC, a 14 bit OPC, and a 4 bit SLS. Standard US signalling has a 24 bit DPC, a 24 bit OPC, and a 5 or 8 bit SLS.

Typically certain transfer points must be utilized or interposed in the signalling network in order to transport signalling messages over great distance from an originating node to a destination node. In fact, several transfer points (e.g. signal transfer points [STPs]) may be used to route signalling message from the originating node to the destination node. The transfer points often take the form of switches that must be configured to accommodate the routing of signalling messages between the originating node and the destination node. Thus, the originating node must configure those transfer points (e.g. set up the switches of the transfer points), and each transfer point must route the signalling message to the next node (e.g. another transfer point), and so on until the destination node is reached.

Figure 4:
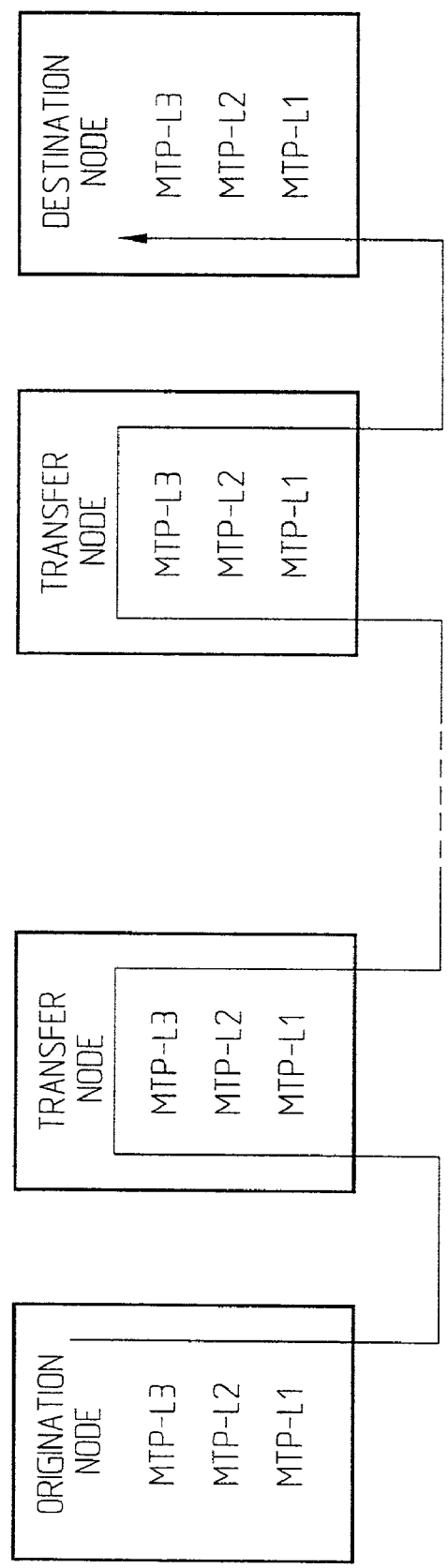
FIG. 4 is a diagrammatic view showing a conventional message path through a signalling system.

To illustrate the foregoing, FIG. 4 depicts a conventional path for a signalling message. FIG. 4 shows an origination node and a destination node, as well as two transfer nodes. A broken line connecting the two transfer nodes serves to indicate that yet other transfer nodes may be situated intermediate the two illustrated transfer nodes. Each node is represented as having the three message transfer part (MTP) layers, particularly MTP-L1, MTP-L2 and MTP-L3. For each node of FIG. 4, for each signalling message MTP-L3 needs to check the originator of the message and then find a link that can transfer the message to the destination node. If the node does not know the destination node, then the message is ignored and the originator is informed that the message could not be routed to the destination node. This type of routing is referred to as MTP-routing. Another type of routing is SCCP-routing, which uses a field called Global Title (GT) to route the message. The MTP-L3 will validate a message as if it was destined for the current node and transfer the message to the SCCP. The SCCP checks the GT to find the actual destination, then calculates a new next node. The message is then transferred to MTP-L3 with new originating and destination point codes. In this type of routing the message is not intact.

Figure 5:
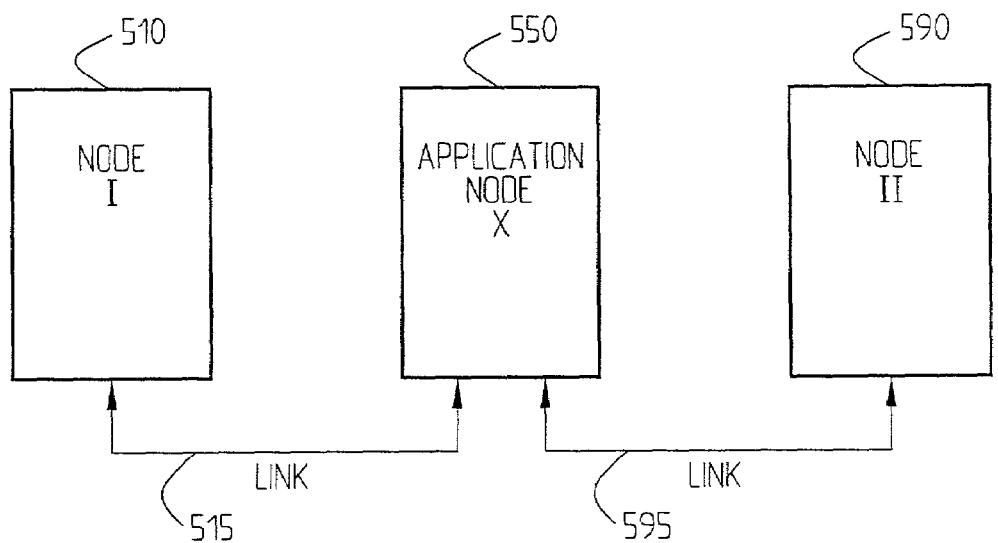
FIG. 5 is a diagrammatic view showing a conventional method of adding an application in an interconnection system.

In some instances it may be desirable to add an application, such as a protocol converter, in a signalling system network. FIG. 5 is a diagrammatic view showing a conventional method of adding an application in an interconnection system. Conventionally an application is added in an application node, application node X, which is connected in between a first node, node I 510, by means of a first link 515, and a second node, node II 590, by means of a second link 595. Traditionally a node has to be added to ensure that communication is handled properly by the link or links that the application is connected to. An application is traditionally connected in OSI layer four or higher, i.e. the lower layers deals with and secures any communication the application has with its clients. Any communication that is handled by OSI layer three or higher, e.g. MTP-L3 or SCCP in a SS7 system, will check the addressing of the received messages, i.e. there must exist an address, a node. As mentioned previously, it is not an advantage to add nodes to a signalling network. Addresses are a limited resource within a network. There are also other problems with adding a node in a network, the node has to be known in the network for message routing. If the application is only of a temporary nature, then there will be problems when the node is removed from the network, as this has to be updated in the network. Keeping the node without an application is only a waste of a node in the network.

Figure 6:
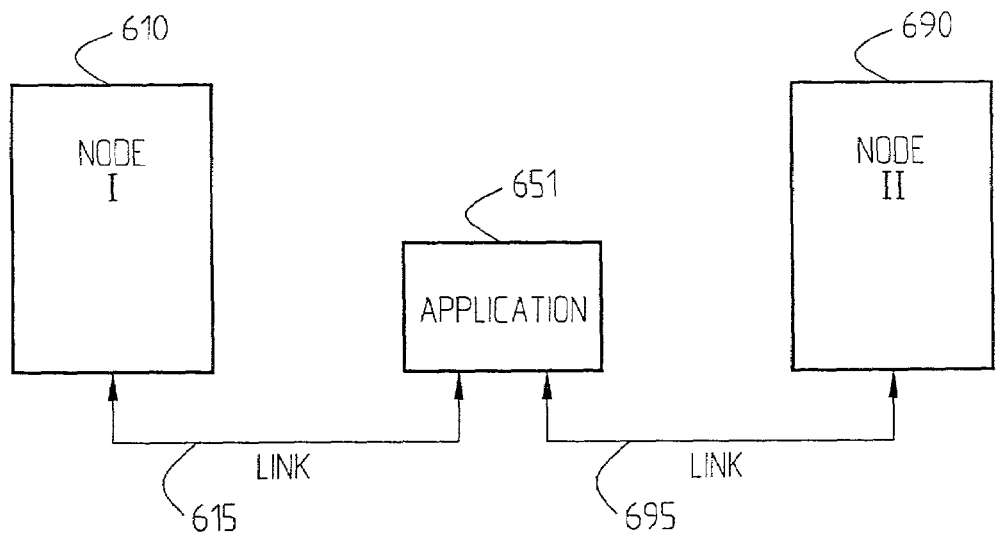
FIG. 6 is a diagrammatic view showing a method of adding an application by means of an application platform in an interconnection system according to an example, non-limiting generic embodiment of the present invention.

FIG. 6 is a diagrammatic view showing a method of adding an application according to a nonlimiting generic embodiment of the present invention. According to the invention an application 651 can be connected between a first node, node I 610, by a first link 615 and a second node, node II 690, by a second link 695. By not creating a node, which the application works within, several advantages are attained. It is easier to add and remove an application, and there is no consumption of a node address. To keep the integrity of the network an application cannot just be added and therefore according to the invention an application is added on top of an application platform. An application platform according to the invention utilizes lower node-independent layers for basic communication and makes the lower layers believe that there are proper higher layers. In a preferred embodiment of the invention, the application platform ensures that that the application platform is invisible by mirroring the link statuses of the connected links.

Figure 7:
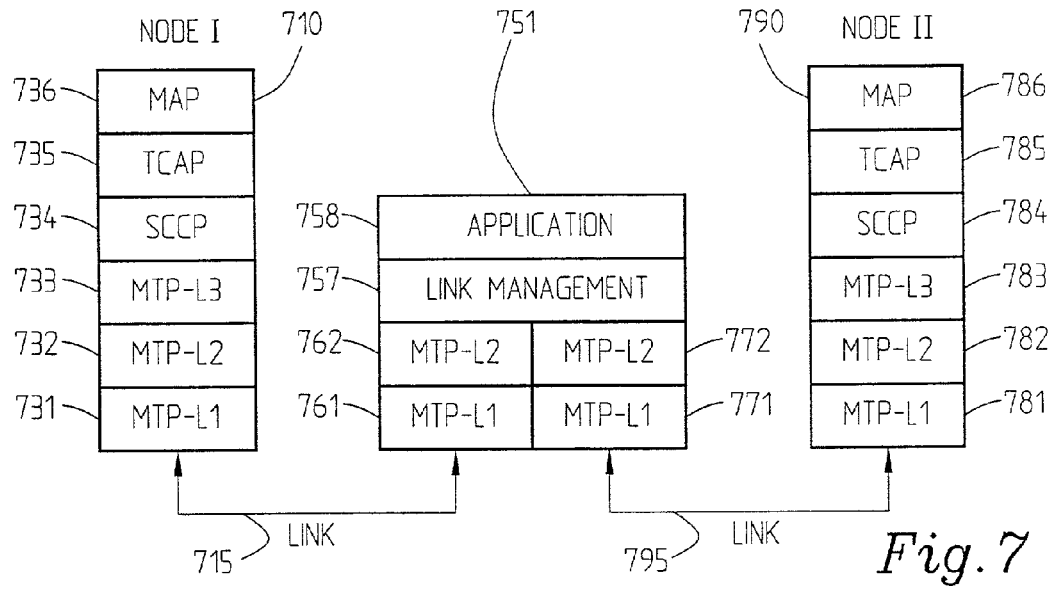
FIG. 7 is a diagrammatic view showing an application platform according to the invention in an SS7 system.

FIG. 7 is a diagrammatic view showing an application platform 751 according to the invention in a mobile SS7 system. As can be seen there are two nodes, node I 710 and node II 790 each represented by a stack comprising MTP-L1 731, 781, MTP-L2 732, 782, MTP-L3 733, 783, SCCP 734, 784, TCAP 735, 785, and MAP 736, 786. The two nodes 710, 790 are connected to the application platform 751 by a first link 715 and a second link 795. The application platform 751 does not comprise complete stacks, only the lower layers MTP-L1 761, 771 and MTP-L2 762, 772, i.e. OSI layers one and two, which do not involve any routing. The application platform further comprises a link management 757 and the application 758 itself. A consequence of not comprising any routing layers is that the application platform 751 is not visible in the network, i.e. the application platform 751 cannot be routed to, it has to be placed on a known link between two nodes. The platform 751 has to be placed on every link between nodes that the application is to act on messages. A signalling message that is to be applied upon by the application 758 in the example of FIG. 7, has to be sent from node I 710 to node II 790 or vice versa. Assuming a message is sent, i.e. routed, from node I 710 to node II 790, a message has to pass down through at least the routing layers comprising possibly SCCP 734, and then MTP-L3 733, further via the data link layer MTP-L2 732, and the physical layer 731 onto the first link 715 to the application platform 751. The message will enter the application platform 751 and only go through a first physical layer MTP-L1 761 and a first data link layer MTP-L2 762 before hitting the link management 757. The link management 757 will emulate higher layers in as much as it will at least enable an upcoming message to be sent down the other stack. For example, in a SS7 system it will convert a DL_MSU_ind to a DL_MSU_req, i.e. a received message will be indicated to a higher layer by the data link layer MTP-L2 762, the link management 757 will then convert this to a request to send the message to the data link layer MTP-L2 772 of the second link 795 stack. The MTP-L2 772 of the second link 795 will send the message to node II 790 via the physical layer MTP-L1 771 and the second link 795. The message will then enter the stack of node II 790 up to at least one of the routing layers MTP-L3 783 or SCCP 784 where it will be dealt with appropriately. The application 758 can work on the message simultaneously as the link management 757. The application 758 can for example be a protocol conversion application, e.g. an application that converts one dialect of SS7 to another dialect of SS7. The application 758 can suitably do some type of preparatory processing for a node comprising for example an AXE switch. New applications can be implemented by the application 758 such that a node does not have to be updated/upgraded at all or at least not for the time being. Temporary functions can be implemented without having to change the functioning of a node. Functions that do not fit into, for example, an updated node can be put into the application 758 instead of having to change the complete hardware of that node.

Figure 8:
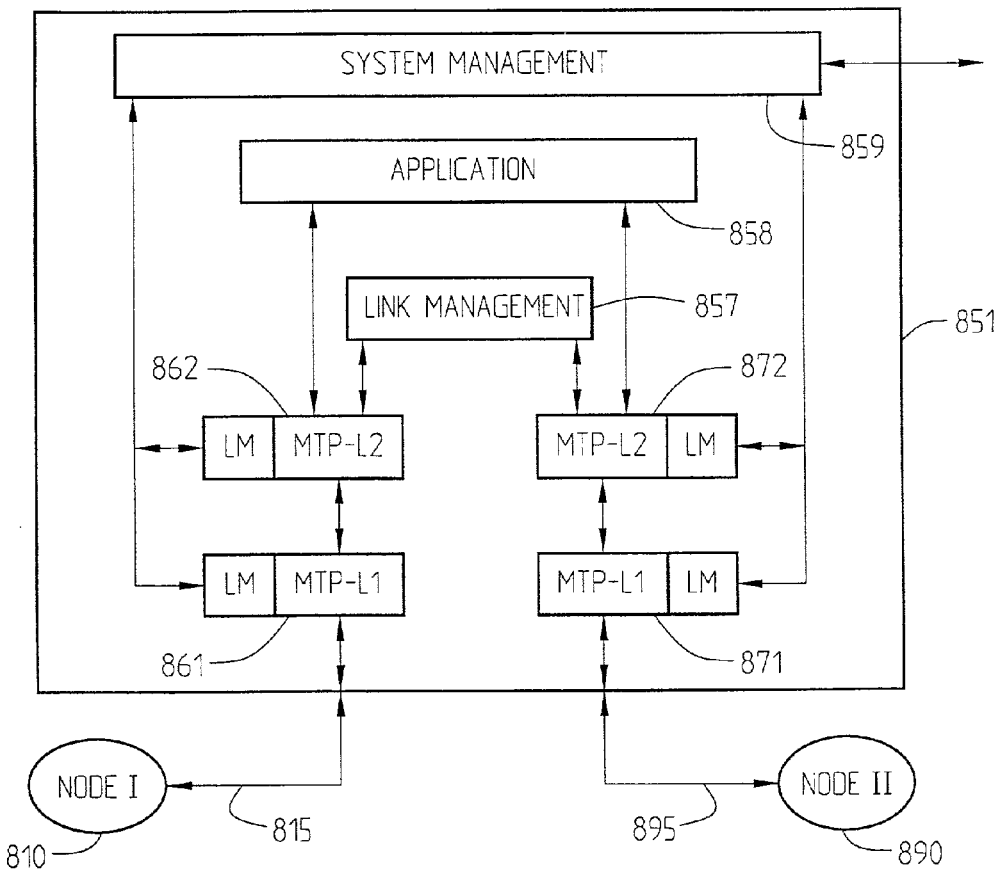
FIG. 8 is a diagrammatic view of an application platform according to the invention, of an SS7 system.

FIG. 8 is a diagrammatic view of a more detailed application platform 851 according to one embodiment according to the invention in an SS7 system, which is a preferred but not exclusive mode of the invention. Illustrated are the two nodes, node I 810 and node II 890, between which the application platform 851 is connected by links 815, 895. Since the application platform 851 is not a node, nor contains any ordinary routing layers (OSI layer 3), node I 810 and node II 890 are operated as if they were directly connected with each other. The application platform's interfaces with the links 815, 895 are two stacks of MTP-L1 861, 871 and MTP-L2 862, 872 layers. The functionality of this interface can suitably be by an MTP-L2 hardware board. By only going to the MTP-L2 layer in the application platform has the advantage of not having to setup a node. If the received messages where processed at an MTP-L3 layer then there is a check to see if the message received was for this "node" or not. Part of the trick of the invention is to avoid having to install more nodes, which then have to be configured in the network. To make this work, the application platform 851 has to make the MTP-L2 862, 872 layers of both stacks believe that they are transferring messages to an MTP-L3 layer and in turn receiving messages from an MTP-L3 layer. According to the invention a link management 857 will process messages to an MTP-L3 layer to be modified to messages to an MTP-L2 layer. The signalling message is said to be changed from a first type of signalling message to a second type of signalling message. Since the second signalling message has essentially the same signalling substantive content as the first type signalling message, the second type signalling message is said to correspond to the first type signalling message. In an SS7 system this is suitably done by, for example, changing for example a received DL_MSU_IND message (an indication of received data) to a DL_MSU_REQ message (a request to send data). The message in itself is not changed. An application 858 of the application platform 851 most probably will change the messages and/or in some manner process the messages.

Indicated in FIG. 8 is also a system management 859 which keeps check of the individual layer managements LM of the MTP-L1 861, 871, and MTP-L2 862, 872 layers. The layer management catches different alarms, to e.g. check link status, and forwards this to the system management 859 which processes and forwards this to hierarchically higher system management levels. An application platform 851 according to the invention is invisible from a routing perspective, but should preferably still be controlled at a system management level.

The application platform 851 divides the link between node I 810 and node II 890 into two links 815, 895. A first link 815 between node I 810 and the application platform 851 and a second link 895 between the application platform 851 and node II 890. To be truly invisible at the routing level, these two links 815, 895 that now exist between the two nodes 810, 890, have to have the same status, i.e. be in the same state. If the first link 815 fails, this must somehow be communicated to node II 890, so that node II 890 can reroute messages over different links. But a link failure of the first link 815 is not seen by node II 890 and the application platform 851 is not a node and does not route or reroute any messages received from node II 890, unless the application is setup to reroute messages. A solution would be to add routing capabilities to the application platform 851, but this would mean making the platform into a node by adding OSI layer three. According to the invention the problem is solved by the application platform 851 by mirroring the link statuses of the links, e.g. if the first link fails, then the platform forces the second link into an artificial failure and is not brought back until the first link comes back into operation.

Figure 9:
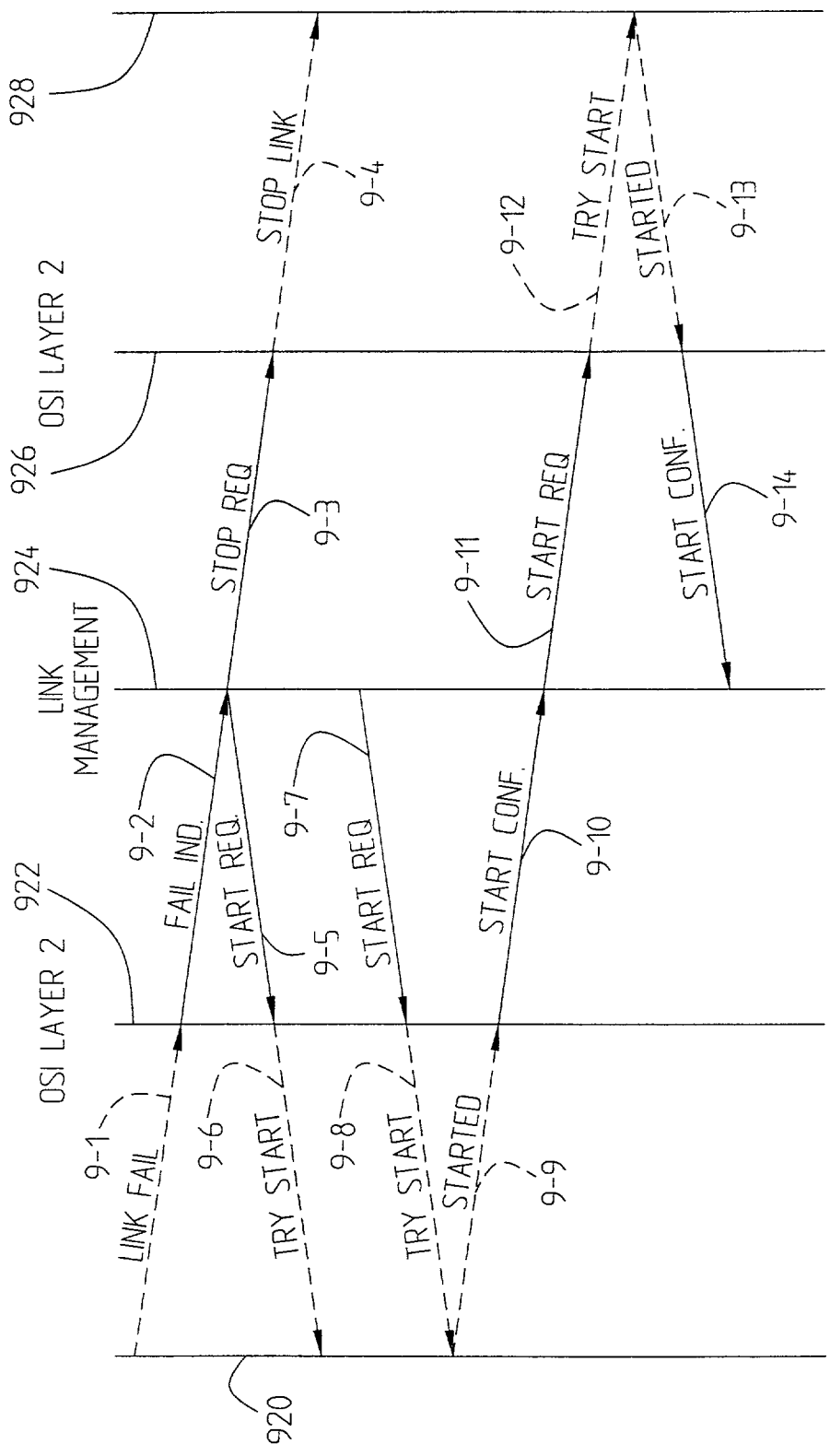
FIG. 9 is a schematic view of an example of basic link status mirroring actions according to the invention.

FIG. 9 is a schematic view of an example of basic link status mirroring actions according to the invention. In a first action 9-1 a first OSI layer two 922, which typically would be an MTP-L2 in an SS7 environment, of the application platform is notified of a link failure between node I and the application platform from either node I 920 or more probably from OSI layer one 920. The first OSI layer two 922 indicates 9-2 the failure to the link management 924. The link management 924 will mirror this to the other link by requesting 9-3 a second OSI layer two 926 associated with the other link to stop. The second OSI layer two will then stop 9-4 the link between the platform and node II. This will, in dependence on protocol used, be sent to OSI layer one 928 or to node II 928. As soon as the link management 924 received the fail indication 9-2 from the first OSI layer two, the link management 924 preferably requests 9-5 the first OSI layer two 922 to start the link again to node I. The first OSI layer two 922 will then attempt to start 9-6 the link to node I. After a time-out of not receiving a start confirmation, the link management 924 will repeat a request to start 9-7 to the first OSI layer two 922, which in turn will attempt to start 9-8 the link. This will be repeated until the link is started 9-9 and a start confirmation 9-10 is received by the link management 924 from the first OSI layer two 922. When the link management 924 receives a start confirmation 9-10, then the link management 924 request 9-11 the second OSI layer two 926 to start the link to node II. The second OSI layer two 926 will then attempt to start 9-12 the link to node II, hopefully (as in this example the failure/stop of this link was artificial) the link is started 9-13 which is then confirmed 9-14 to the link management 924. Both links should thus be up and running again.

FIG. 9 illustrates the mirroring of link status according to the invention of a link failure of only one link to/from node I. However, the person skilled in the art appreciates that the actions of FIG. 9 apply to other status conditions of the links between the application platform and the connected nodes. Moreover, it is understood that the mirroring of link status equally applies to the link to/from node II and has essentially the same actions as shown in FIG. 9.

To make the platform simpler, preferably the only acknowledgements eminating from the application platform are those acknowledgements which the application platform receives on the first link and forwards to the second link, and those acknowledgments the application platform receives on the second link and forwards to the first link. Otherwise the application platform might have acknowledged something before it is transferred along to the other node, which might become difficult if the link to that node just fails. The application platform then has to buffer and resend. By not acknowledging anything that is received but letting the actual destination node do this ackowledging which is then sent back to the originating node through the application platform, then the transfer will become safer and the platform will become even more unobtrusive.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

FIG. 1 is a diagrammatic view of the OSI Reference Model,
OSI layer 1—physical layer.
OSI layer 2—data link layer.
OSI layer 3—network layer.
OSI layer 4—transport layer.
OSI layer 5—session layer.
OSI layer 6—presentation layer.
OSI layer 7—application layer.

FIG. 2 is a diagrammatic view of protocol components of the Signalling System No. 7 (SS7) referenced to the OSI Reference Model,
201 OSI layer 1—physical layer.
202 OSI layer 2—data link layer.
203 OSI layer 3—network layer.
204 OSI layer 4—transport layer.
205 OSI layer 5—session layer.
206 OSI layer 6—presentation layer.
207 OSI layer 7—application layer.
210 MTP-L1—Message Transfer Part Level 1—corresponds to OSI layer 1.
220 MTP-L2—Message Transfer Part Level 2—corresponds to OSI layer 2.
230 MTP-L3—Message Transfer Part Level 3—corresponds to part of OSI layer 3.
240 TUP—Telephone User Part—corresponds to part of OSI layer 3 to OSI layer 7.
250 ISUP—ISDN User Part—corresponds to part of OSI layer 3 to OSI layer 7.
260 SCCP—Signalling Connection Control Part—corresponds to part of OSI layer 3.
270 TCAP—Transaction Capabilities Application Part—corresponds to OSI layer 7.
280 Management—deals mainly with error management of all levels/layers.

FIG. 3 is a diagrammatic view showing the format of an MTP-L2 header as including an MTP-L3 header and a routing label,
MTP-L2
F—Flag.
BSN—Backward Sequence Number.
BIB—Backward Indicator Bit.
FSN—Forward Sequence Number.
FIB—Forward Indicator Bit.
LI—Length Indicator.
SIO—Service Information Octet.
SIF—Signalling Information Field.
C—Checksum.
F—Flag.
MTP-L3
Service indicator—used to perform message distribution and in some cases to perform message routing.
Sub-service field—network indicator and to discriminate between national and international messages.

FIG. 4 is a diagrammatic view showing a conventional message path through a signalling system,
Origination node.
Transfer node.
Destination node.

FIG. 5 is a diagrammatic view showing a conventional method of adding an application in an interconnection system,
510 Node I
515 Link between Application node X and Node I
550 Application node X
590 Node II
595 Link between Application node X and Node II FIG. 6 is a diagrammatic view showing a method of adding an application, suitably by means of an application platform in an interconnection system, according to a non-limiting generic embodiment of the present invention,
610 Node I
615 Link between Application and Node I
651 Application
690 Node II
695 Link between Application and Node II FIG. 7 is a diagrammatic view showing an application platform according to the invention in an SS7 system,
710 Node I
715 Link between node I and application platform
731 MTP-L1—Message Transfer Part Level 1—of node I
732 MTP-L2—Message Transfer Part Level 2—of node I.
733 MTP-L3—Message Transfer Part Level 3—of node I.
734 SCCP—Signalling Connection Control Part—of node I.
735 TCAP—Transaction Capabilities Application Part—of node I.
736 MAP—Mobile Application Part
751 Application platform
757 Link management of application platform.
758 Application of application platform.
761 MTP-L1—Message Transfer Part Level 1—of application platform—node I link side
762 MTP-L2—Message Transfer Part Level 2—of application platform—node I link side.
771 MTP-L1—Message Transfer Part Level 1—of application platform—node II link side.
772 MTP-L2—Message Transfer Part Level 2—of application platform—node II link side.
781 MTP-L1—Message Transfer Part Level 1—of node II
782 MTP-L2—Message Transfer Part Level 2—of node II.
783 MTP-L3—Message Transfer Part Level 3—of node II.
784 SCCP Signalling Connection Control Part—of node II.
785 TCAP—Transaction Capabilities Application Part—of node II.
786 MAP—Mobile Application Part—of node II.
790 Node II
795 Link between application platform and node II FIG. 8 is a diagrammatic view of an application platform according to the invention in an SS7 system,
810 Node I
815 Link between node I and application platform
851 Application platform
857 Link management of application platform.
858 Application of application platform.
859 System management
861 MTP-L1—Message Transfer Part Level 1—of application platform—node I link side
862 MTP-L2—Message Transfer Part Level 2—of application platform—node I link side.
871 MTP-L1—Message Transfer Part Level 1—of application platform—node II link side.
872 MTP-L2—Message Transfer Part Level 2—of application platform—node II link side.
890 Node II
895 Link between application platform and node II FIG. 9 is a schematic view of an example basic link status mirroring actions according to the invention.
920 node I/link/OSI layer one
922 OSI layer 2 on node I link side
924 Link management
926 OSI layer 2 on node II link side 928 node II/link/OSI layer one
9-1 Link fail—to OSI layer 2 on node I link side
9-2 Fail indication—to link management
9-3 Stop request—to OSI layer 2 on node II link side
9-4 Stop link to node II
9-5 First Start request—to OSI layer 2 on node I link side
9-6 Try to Start link to node I
9-7 Ssecond Start request—to OSI layer 2 on node I link side
9-8 Try to Start link to node I
9-9 Started link to node I
9-10 Start confirm—to link management
9-11 Start request—to OSI layer 2 on node II link side
9-12 Start link to node II
9-13 Started link to node II
9-14 Start confirm—to link management

The invention claimed is:

1. An application platform for the addition of an application between a first node and a second node of a telecommunications signalling system which utilize a signalling protocol, by means of connection of the application platform between the first node and the second node, characterized in that the application platform comprises:
 a first interface stack coupled to the first node by means of a first link;
 a second interface stack coupled to the second node by means of a second link;
 a link management unit coupled to the first interface stack and to the second interface stack;
and in that the link management unit mirrors a status of one link onto the other link by forcing it to assume the same kind of status, and in that the first interface stack and the second interface stack being incomplete stacks in relation to OSI standard routing functions, thereby enabling a connection of the application platform between the first node and the second node with still the first node considering itself connected directly to the second node by means of the first link without any intervening node or nodes and with still the second node considering itself connected directly to the first node by means of the second link without any intervening node or nodes.

2. The application platform according to claim 1, characterized in that the link management unit mirrors a status of one link onto the other link by being arranged:
 to receive reports of a first type of a status of the first link from the first interface stack;
 to receive reports of a second type of a status of the second link from the second interface stack;
 to direct to the second interface stack to control the second link in accordance with any received report of the first type; and
 to direct to the first interface stack to control the first link in accordance with any received report of the second type;
thereby forcing the other link to assume the same kind of status.

3. The application platform according to claim 2, characterized in that the link management unit is further arranged:
 to direct to the first interface stack to restore the first link after a received report of the first type of a link failure status of the first link;
 to direct to the second interface stack to restore the second link after a received report of the second type of a link failure status of the second link.

4. The application platform according to claim 2, characterized in that the link management unit is further arranged:
 to direct to the first interface stack to restore the first link after a received report of the second type of a link restored status of the second link;
 to direct to the first interface stack to stop the first link after a received report of the second type of a link failure status of the second link;
 to direct to the second interface stack to restore the second link after a received report of the first type of a link restored status of the first link;
 to direct to the second interface stack to stop the second link after a received report of the first type of a link failure status of the first link.

5. The application platform according to claim 1, characterized in that the first interface stack and the second interface stack being incomplete stacks in relation to OSI standard routing functions, in that each of the stacks only consists of OSI layer one and OSI layer two.

6. The application platform according to claim 1, characterized in that the link management unit changes a signalling message, which is received from one interface stack, from a first type of signalling message to a second type of signalling message of the same signalling protocol before the received signalling message is transferred to the other interface stack.

7. The application platform according to claim 6, characterized in that the first type of signalling message is a signalling message from an OSI layer two and that the second type of signalling message is a signalling message to an OSI layer two.

8. The application platform according to claim 1, characterized in that the signalling protocol of at least the first node is Signalling System No. 7 (SS7), and where the first link is a first SS7 signalling link.

9. The application platform according to claim 8, characterized in that the first interface stack is a first stack of MTP-L1 layer and MTP-L2 layer.

10. The application platform according to claim 1, characterized in that the signalling protocol is Signalling System No. 7 (SS7), where the first link is a first SS7 signalling link, and where the second link is a second SS7 signalling link.

11. The application platform according to claim 10, characterized in that the first interface stack is a first stack of MTP-L1 layer and MTP-L2 layer, and where the second interface stack is a second stack of MTP-LI layer and MTP-L2 layer.

12. The application platform according to claim 1, characterized in that the application platform further comprises an application process which work on the interface stacks.

13. The application platform according to claim 12, characterized in that the application process is a protocol converter, converting a received signalling message to another dialect of the protocol of the received signalling message or to another protocol than the protocol of the received signalling message.

14. The application platform according to claim 12, characterized in that the application process is a node preprocessor, preprocessing signalling messages destined for the node in question.

15. The application platform according to claim 1, characterized in that the link management unit mirroring does not start until after an alignment of the first link and the second link has been performed.

16. The application platform according to claim 1, characterized in that the only OSI layer one and OSI layer two acknowledgements coming from the application platform are those acknowledgements which the application platform receives on the first link and forwards to the second link, and those acknowledgments the application platform receives on the second link and forwards to the first link.

17. A method for adding an application between a first node and a second node of a telecommunications signalling system which signalling system utilizes a signalling protocol, characterized in that the method comprises the steps of:
coupling a first interface stack to the first node by means of a first link, the first interface stack being an incomplete stack in relation to OSI standard routing functions;
coupling a second interface stack to the second node by means of a second link, the second interface stack being an incomplete stack in relation to OSI standard routing functions;
coupling a link management unit to the first interface stack and to the second interface stack;
the link management unit mirroring a status of one link onto the other link by forcing it to assume the same kind of status;
thereby enabling a connection of the application platform between the first node and the second node with still the first node considering itself connected directly to the second node by means of the first link without any intervening node or nodes and with still the second node considering itself connected directly to the first node by means of the second link without any intervening node or nodes.

18. The method according to claim 17, characterized in that the step of the link management unit mirroring a status of one link onto the other link comprises the steps of:
receiving reports of a first type of a status of the first link from the first interface stack;
receiving reports of a second type of a status of the second link from the second interface stack;
directing the second interface stack to control the second link in accordance with any received report of the first type; and
directing to the first interface stack to control the first link in accordance with any received report of the second type;
thereby forcing the other link to assume the same kind of status.

19. The method according to claim 18, characterized in that the link management unit further comprises the steps of:
directing the first interface stack to restore the first link after a received report of the first type of a link failure status of the first link;
directing the second interface stack to restore the second link after a received report of the second type of a link failure status of the second link.

20. The method according to claim 18, characterized in that the link management unit further comprises the steps of:
directing the first interface stack to restore the first link after a received report of the second type of a link restored status of the second link;
directing the first interface stack to stop the first link after a received report of the second type of a link failure status of the second link;
directing the second interface stack to restore the second link after a received report of the first type of a link restored status of the first link;
directing the second interface stack to stop the second link after a received report of the first type of a link failure status of the first link.

21. The method according to claim 17, characterized in that the first interface stack and the second interface stack being incomplete stacks in relation to OSI standard routing functions in that each of the stacks only consists of OSI layer one and OSI layer two.

22. The method according to claim 17, characterized in that the link management unit further comprises the step of:
changing a signalling message, which is received from one interface stack, from a first type of signalling message to a second type of signalling message of the same signalling protocol before the received signalling message is transferred to the other interface stack.

23. The method according to claim 22, characterized in that the first type of signalling message is a signalling message from an OSI layer two and that the second type of signalling message is a signalling message to an OSI layer two.

24. The method according to claim 17, characterized in that the signalling protocol of at least the first node is Signalling System No. 7 (SS7), and where the first link is a first SS7 signalling link.

25. The method according to claim 24, characterized in that the first interface stack is a first stack of MTP-L1 layer and MTP-L2 layer.

26. The method according to claim 17, characterized in that the signalling protocol is Signalling System No. 7 (SS7), where the first link is a first SS7 signalling link, and where the second link is a second SS7 signalling link.

27. The method according to claim 26, characterized in that the first interface stack is a first stack of MTP-L1 layer and MTP-L2 layer, and where the second interface stack is a second stack of MTP-L1 layer and MTP-L2 layer.

28. The method according to claim 17, characterized in that the application platform further comprises an application process which work on the interface stacks.

29. The method according to claim 28, characterized in that the application process comprises the step of converting a received signalling message to another dialect of the protocol of the received signalling message or to another protocol than the protocol of the received signaling message.

30. The method according to claim 28, characterized in that the application process comprises the step of preprocessing signalling messages destined for a node in question.

31. The method according to claim 17, characterized in that the link management unit step of mirroring does not start until after an alignment of the first link and the second link has been performed.

32. The method according to claim 17, characterized in that the only OSI layer one and layer two acknowledgements eminating from the application platform are those acknowledgements which the application platform receives on the first link and forwards to the second link, and those acknowledgments the application platform receives on the second link and forwards to the first link.

* * * * *